US00RE49096E

(19) United States
(12) Reissued Patent
Schwartz

(10) Patent Number: US RE49,096 E
(45) Date of Reissued Patent: Jun. 7, 2022

(54) MAGNETIC TOY TRAIN TRACKS AND MAGNETIC ENVIRONMENT

(71) Applicant: Hutton Toys, LLC, New York, NY (US)

(72) Inventor: Yaacov Schwartz, Brooklyn, NY (US)

(21) Appl. No.: 16/922,046

(22) Filed: Jul. 7, 2020

Related U.S. Patent Documents

Reissue of:
(64) Patent No.: 10,022,640
Issued: Jul. 17, 2018
Appl. No.: 14/837,819
Filed: Aug. 27, 2015

U.S. Applications:
(63) Continuation-in-part of application No. 14/605,783, filed on Jan. 26, 2015, now abandoned.

(60) Provisional application No. 61/931,079, filed on Jan. 24, 2014.

(51) Int. Cl.
*A63H 19/30* (2006.01)

(52) U.S. Cl.
CPC ..... *A63H 19/30* (2013.01)

(58) Field of Classification Search
CPC ..... A63H 18/00; A63H 18/02; A63H 19/00; A63H 19/30; A63H 19/24
USPC ..... 238/10 R
See application file for complete search history.

(56) References Cited

U.S. PATENT DOCUMENTS

| | | | | |
|---|---|---|---|---|
| 6,398,121 | B1 * | 6/2002 | Morgan | A63H 19/30 238/10 B |
| 2005/0098645 | A1 * | 5/2005 | Cheng | A63H 19/30 238/10 R |
| 2010/0248586 | A1 * | 9/2010 | Cochella | A63H 18/02 446/444 |

* cited by examiner

*Primary Examiner* — Beverly M Flanagan
(74) *Attorney, Agent, or Firm* — Aronberg Goldgehn Davis & Garmisa

(57) ABSTRACT

Toy train track segments of non-magnetic metals and a toy train track comprised of the non-magnetic track segments and a system of magnetic elements configured to be magnetically inter-connected with each other in varying positions and configurations for building up of environmental structures for a train track layout The toy track segments are configured for magnetic coupling with each other to provide the toy train track, with each segment having at least one edge for abutted coupling to an edge of another track segment wherein each abutted edge has at least one magnet imbedded therein and the imbedded magnet or magnets being positioned to be aligned with a magnet or magnets of another abutted edge to effect the magnetic coupling. The environmental magnetic elements include imbedded magnets around the peripheries thereof or at designated points of magnetic attachment.

7 Claims, 12 Drawing Sheets

MAGNETIC TOY TRAIN TRACKS AND MAGNETIC ENVIRONMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates to tracks and track sections used for toy trains and particularly toy track elements integrated in a magnetic toy train layout.

BACKGROUND

Train tracks used by children and hobbyists are constructed from basic sections segments (the terms segments and sections are used interchangeably herein) such as of arc, square and rectangular shapes. When the segments are connected, they form the familiar circles and oval train tracks on which toy trains such as of plastic or hobbyist trains such as Lionel trains, use as a base for directed and controlled train travel. A cross over segment in the shape of a plus sign or cross or a Y-shaped segment (for a siding configuration) enable the further building of train tracks, which cross over segments of other tracks such as in figure 8 configurations and more realistic toy or hobby train travel structures.

A basic method and structure of the track segments for connection is that of interlocking extending segments and corresponding insertion sections on each of the track segments. The extending segments are often removable for different positional placement to provide more flexibility with respect to track constructions. Simple abutment of track segments is not desirable since the weight and movement of the toy trains on track segments, particularly of non-linear configurations, easily causes track segment movement out of position and misalignments.

SUMMARY OF THE INVENTION

It is an object of the present invention to provide non-extending connections for toy train track sections or segments and the track segments so made.

It is a further object of the invention to provide such toy track sections or segments with imbedded magnetic elements with a placement and a type of magnet which permits connection of track sections in any desired proper configuration.

It is a still further object of the invention to provide such track sections with peripheral magnetic scenic elements with variations in configurations.

Generally the present invention comprises toy train segments of materials such as wood or plastic or of non-magnetic metals and a system of magnetic elements configured to be inter-attached with each other in varying positions and configurations for building up of environmental structures for a train track layout. The invention further comprises a toy train track comprised of the non-magnetic track segments configured for magnetic coupling with each other to provide the toy train track, with each segment having at least one edge for abutted coupling to an edge of another track segment wherein each abutted edge has at least one magnet imbedded therein and the imbedded magnet being positioned to be aligned with a magnet of another abutted edge to effect the magnetic coupling.

The connection edges of the train segments are provided with imbedded magnets preferably of bar shape and preferably at least two magnets per edge. The magnets are symmetrically placed along the edges such that the train segments so matter how arranged or inverted, provide for aligned magnets of opposite polarity and attraction rather than repelling when the segments are properly aligned. The exposed magnetic field at the track segment edges provide an externally extending magnetic field which is sufficient to enable pairs of track sections to be securely held against dislodgement with normal toy train use. The magnetic field attraction and connection should not however be excessive with possible dislodgement of the imbedded magnets or with making of detachment overly difficult, particularly for children. In one embodiment all of the track and magnetic elements with magnet pairs have such pairs dimensionally substantially equivalent in size and element edge positioning whereby elements are properly abutted and attached thereby. In addition, in the embodiment, the magnet pairs are symmetrically positioned such all magnet pairs magnetically connectable regardless of abutment orientation.

Standard track segments of arcs, squares or rectangular shapes have two connection edges with magnets deployed at each of the end or connective edges. Cross-over segments having three (Y shaped), four (cross shaped) or more edges include magnetic elements at each of the edges used for connection. The track segments such as of molded plastic are provided with an upper surface having raised linear channels to guide train wheels therethrough in a proper forward path. It is however possible to provide such channels on both upper and lower surfaces provided that magnetic alignment and position stability of segments is not detrimentally affected.

Environmental magnetic elements of various shapes and sizes include L shapes, archways (either small and of single element units or larger of magnetically held together compound elements), triangles of varying sizes (equilateral or isosceles), squares (whether apertured for further connections or solid), window squares with multiple (e.g. symmetrical opening such as four squares or two rectangles), circle quadrants, multiple leg elements (such as of E configuration with three or four legs) and small rectangles. The environmental magnetic elements have imbedded magnets completely around their respective peripheries (generally 6 or 8 magnetics for the shapes just described) in contrast to the end positioned magnetics of the track sections themselves which are end abutted and magnetically held in a linear track configuration. It is however possible for the track sections to include secondary peripheral magnetic in order to more closely support built up environmental magnetic elements.

The environmental elements are basic building blocks for a child (or an adult so inclined) to build up environmental structures for the train tracks with magnetic connections between such elements. Additionally such elements may be used separately from the train tracks to build up structures of varying shapes and sizes and limited only by the user's imagination and number of elements available.

The above and objects, features and advantages of the invention will become more evident from the following drawings in which:

SHORT DESCRIPTION OF THE DRAWINGS

FIG. 4a is a cross-over track section and FIG. 4b is a figure 8 train track configuration made with arced segments (connection demarcations not shown) with square straight track sections and the central cross-over section of FIG. 4a;

DETAILED DESCRIPTION

Figure 2:
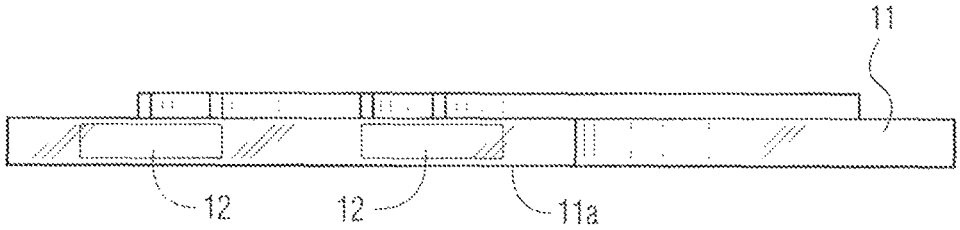
FIG. 2 depicts a front edge view of a train track segment, as embodied in all of the segments in the track as shown in FIG. 1, with the arranged imbedded edge magnets.
Figure 7:
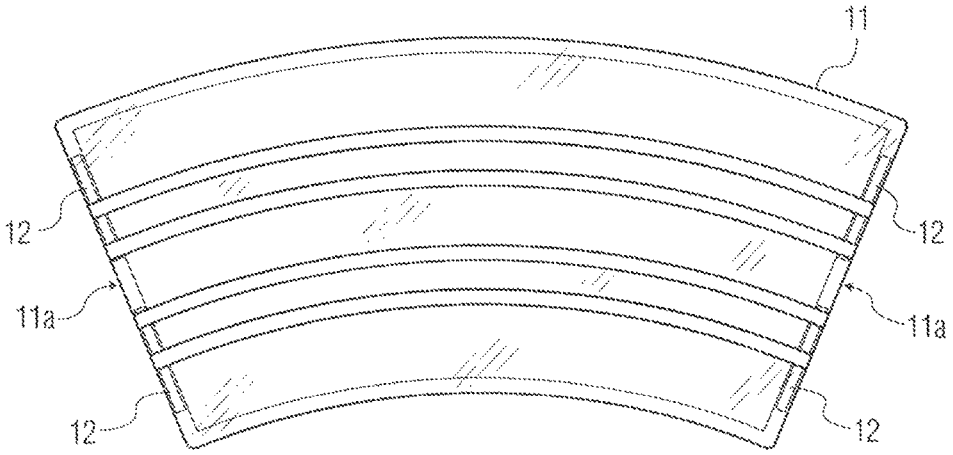
FIG. 7 is a curved track section.

With reference to the drawings, a circular track 10 of magnetic curved track elements 11 shown in FIG. 7 is shown with a toy train 1 positioned thereon in a basic track structure. FIG. 2 is a side view of an end 11a of the magnetic curved track element 11 of FIG. 7 showing the imbedded placement of magnets 12 in a symmetrical manner whereby abutment of the ends 11a of another track element 11 to the first trek element effects a structural magnetic attachment.

Figure 3:
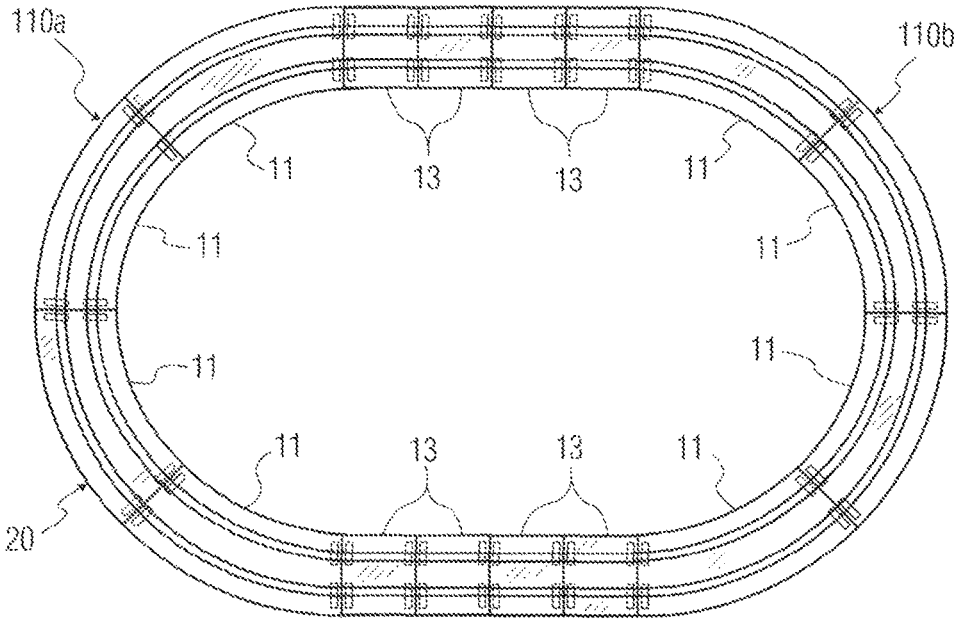
FIG. 3 is a top view of an oval track made with arc and rectangular straight track sections held together with the magnetic connection of the present invention.

FIG. 3 depicts a different oval shaped train track 20 with the curved ends 110a and 110b being comprised of curved track elements 11 (four at each end 110a and 110b). The ends 110a and 110b are connected in a continuous track oval with eight rectangular track elements 13, shown in FIG. 8 (four on each side). The square track elements 14 in FIG. 8 may be used in place of the rectangle track elements 13 with a resultant shorter overall track length.

Figure 4A:
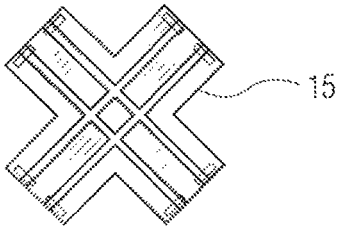
Figure 4B:
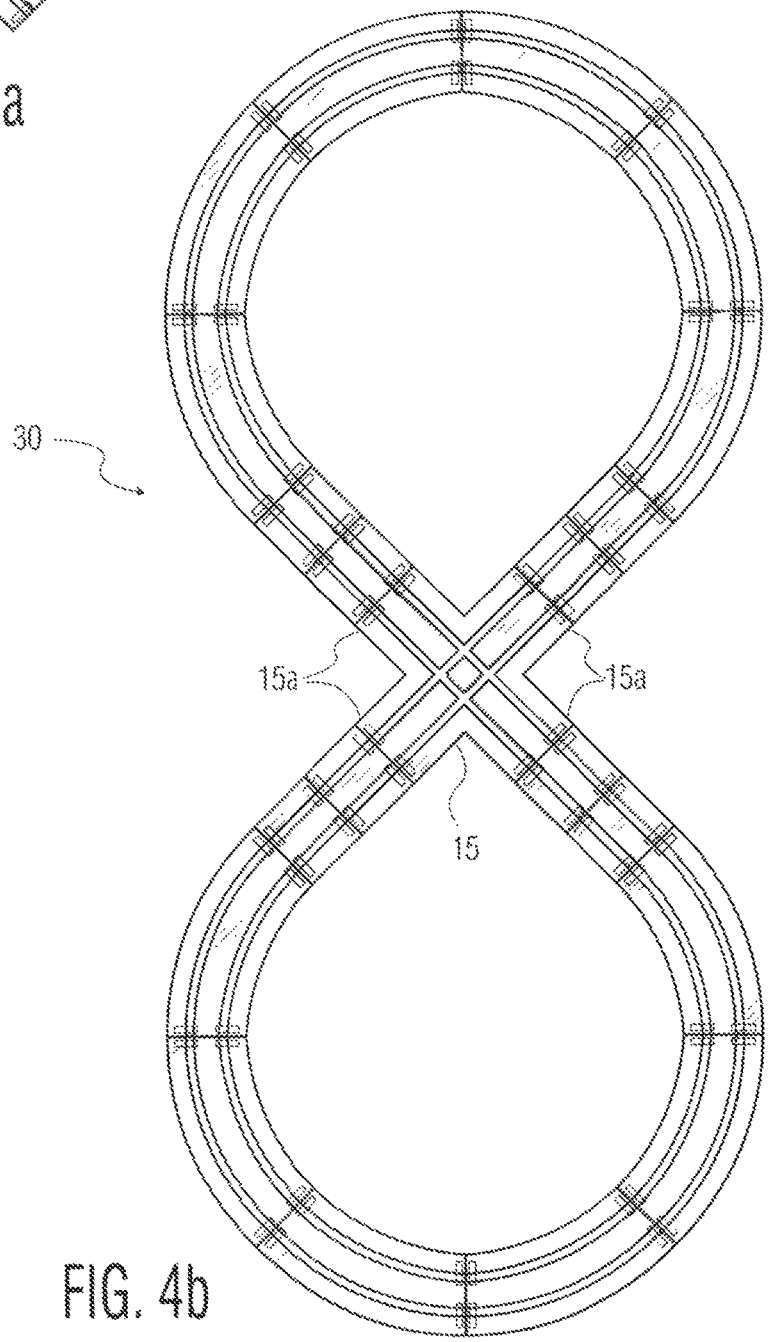
Figure 6:
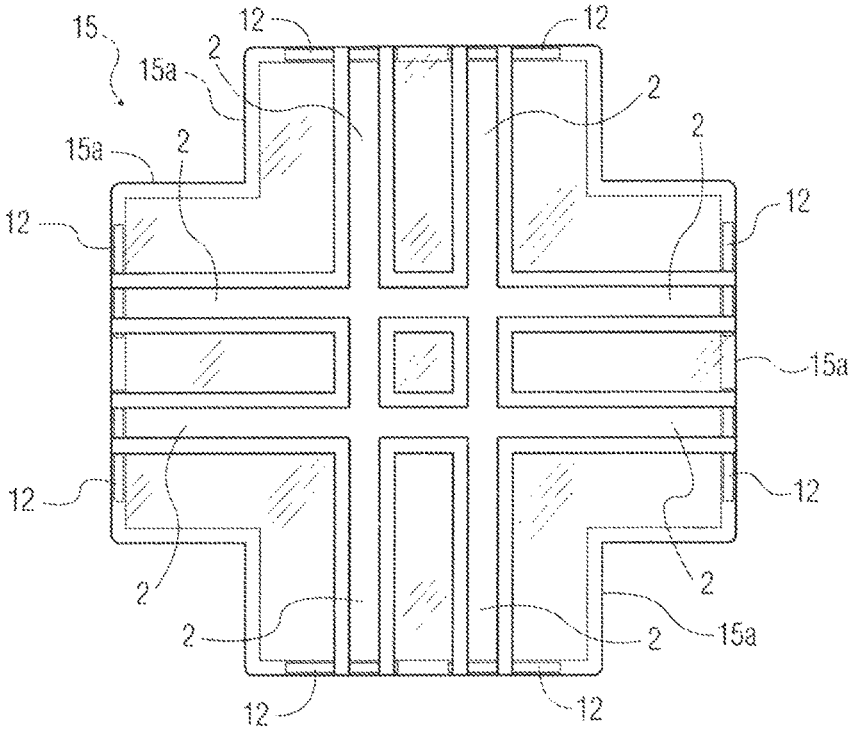
FIG. 6 is an enlarged view of the cross-over track section of FIG. 4a showing track rails and imbedded magnet elements.

The cross-over track element 15 of FIGS. 4a and 6 is used in the cross-over track 30 of FIG. 4b with demarcation lines showing placement of the cross over element 15 used in abutting magnetic connection with eight (two on each leg 15a of cross-over track element 15).

Figure 1:
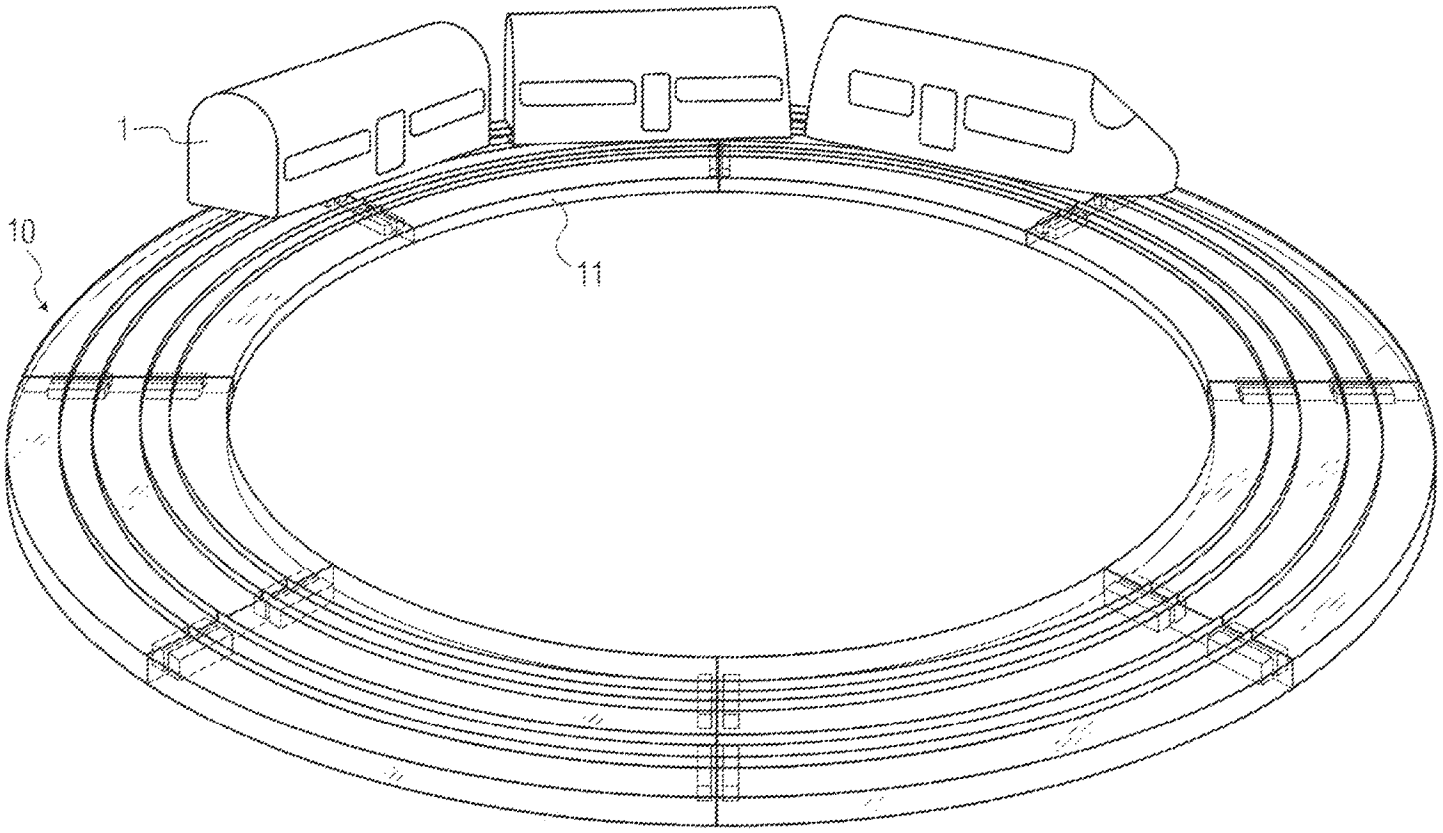
FIG. 1 shows a toy train of a circular toy train track made of arc track segments with magnetic couplings.
Figure 5:
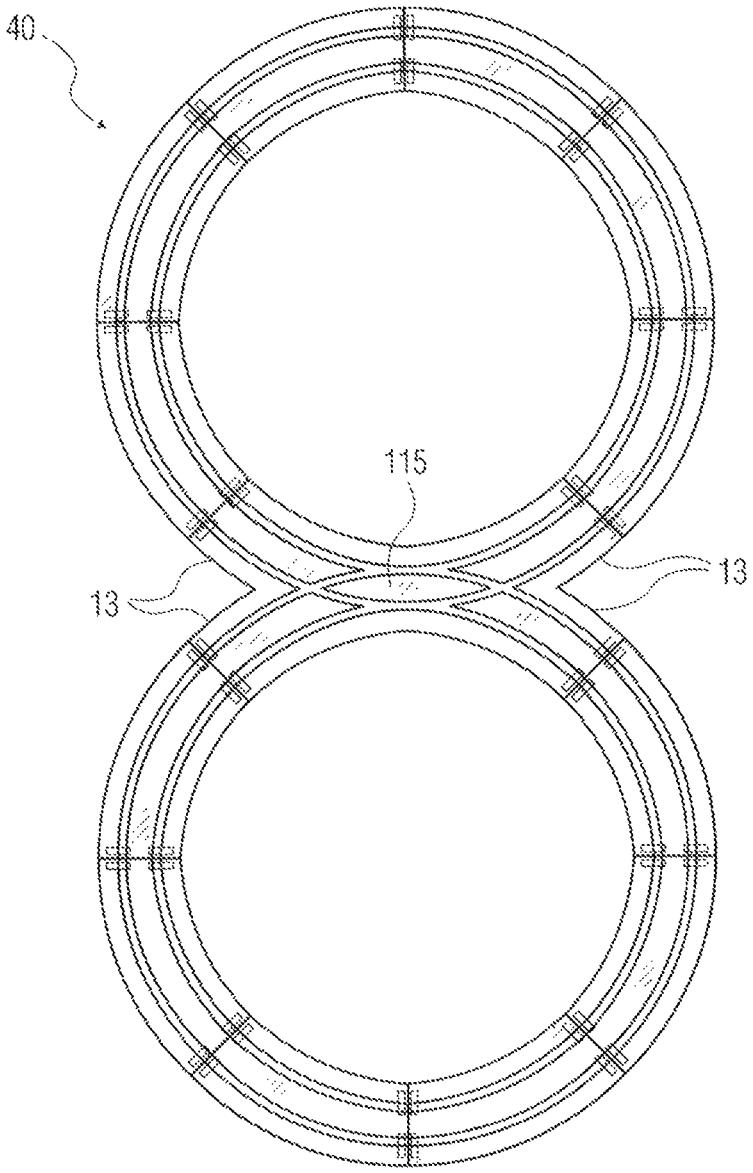
FIG. 5 is variation of part of the track shown in FIG. 4b with different segment configurations.

FIG. 5 depicts a cross-over track 40 having four rectangular track elements 13 with a central cross-over square 115. FIG. 6 shows the cross-over track element 15 with four legs 15a and with a pair of wheel channels (or tracks) 2 for the toy train 1 shown in FIG. 1, set at right angles to each other to effect track cross overs in two directions. Pair of magnets 12 are imbedded at the periphery of each of the legs 15a to effect the magnetic connections with other track elements positioned adjacent thereto.

FIG. 7 shows a curved track element 11 as used in construction of the tracks 10, 20 and 30 shown in FIGS. 1, and 3-5 with a pair of curved track channels 2. Pairs of magnets are positioned at the ends 11a thereof as shown in FIG. 2 for abutted magnetic connection with other track elements. Square track element 15, shown in FIG. 8, provides flexibility in making train track structures of varying lengths and is directly exchangeable with the rectangular track elements 13.

Figure 8:
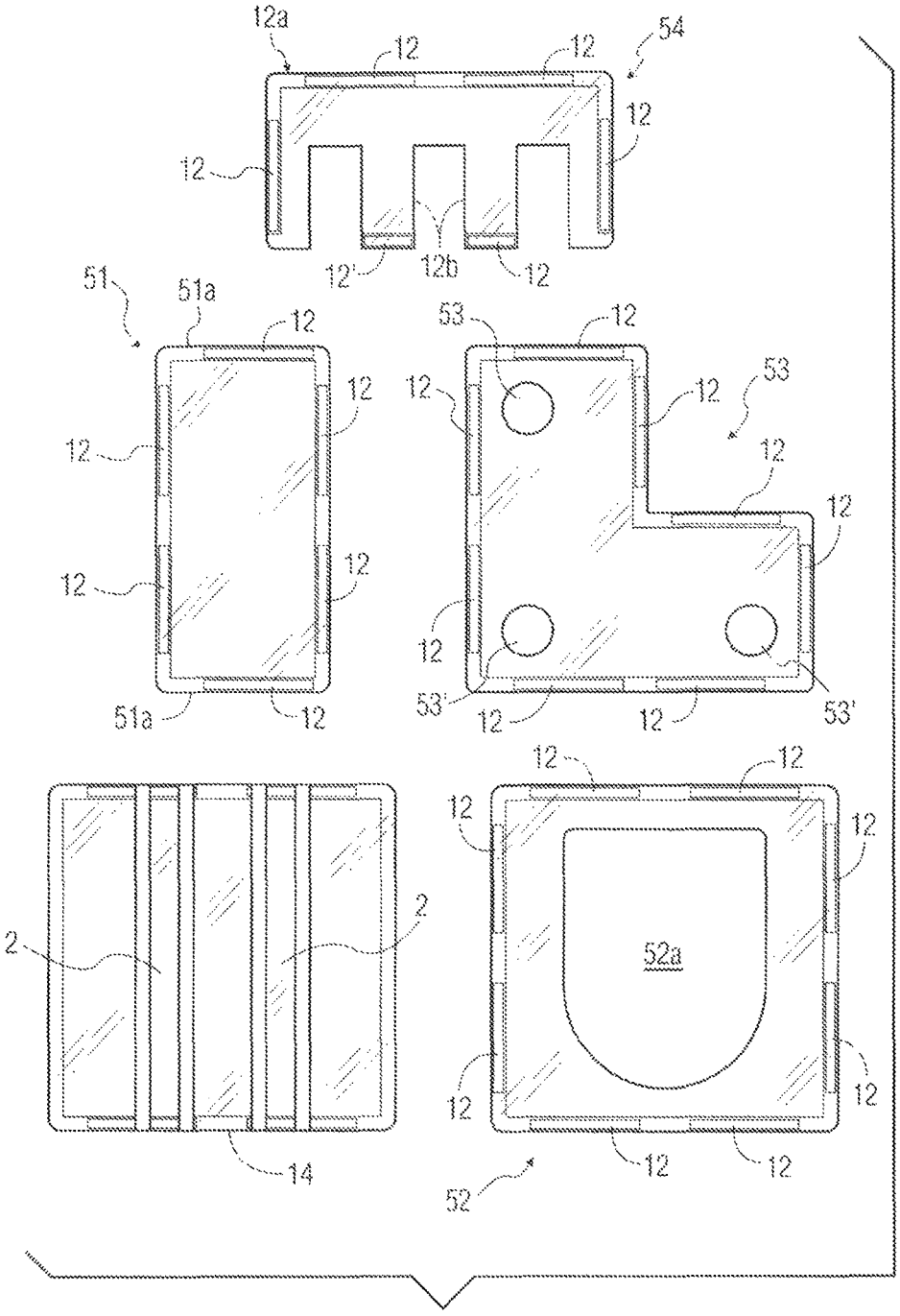
FIG. 8 is a view of a square track section and rectangular, four footed E shaped element, L-shaped element with circular cut outs and an arch section element.
Figure 12:
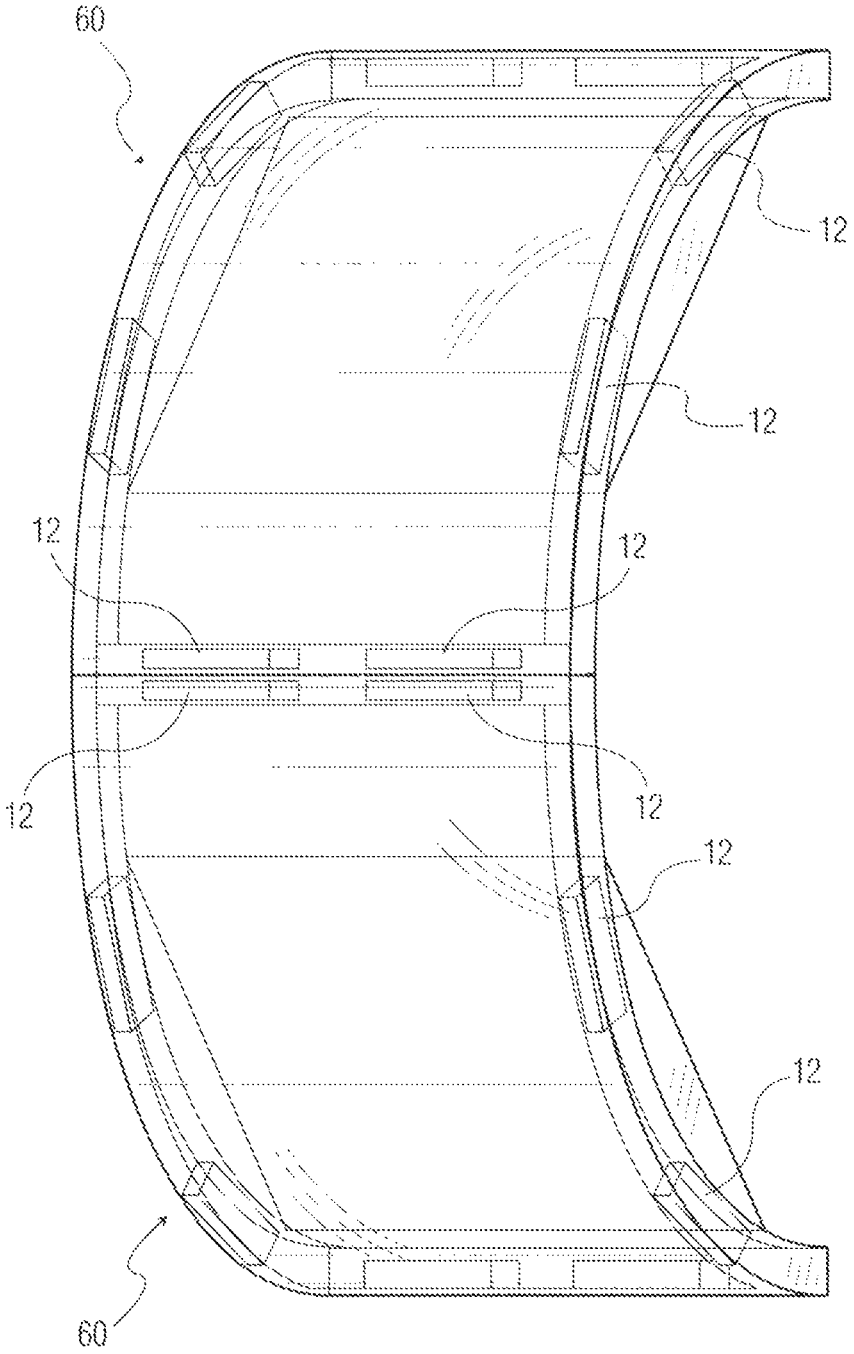

In FIG. 8, environmental magnetic element 51 is a small rectangle and as such has only one magnet 12 at each of its ends 51a and two magnets 12 at each of the sides 51b. Archway element 52, which be magnetically positioned between track elements with the train being able to pass through the arch. Eight magnets 12 are imbeddedly positioned around the perimeter of the archway. Because of the leg in L-shaped element 53, it has eight magnets 12 around its perimeter. As shown, L-shaped element 53 has three circular cutouts 53' whereby rods (not shown) may be used to build up connective structures with other similar elements. In FIG. 12 an L-shaped element 53a is shown without any circular cutouts.

As shown in FIG. 8, four legged E-shaped element 54 has four imbedded magnets 12 around its continuous periphery 12a. Small magnets 12' are imbedded at the bottom of the middle legs 12b whereby element 54 may be magnetically attached and position with either the legs facing up or down, with the building of environmental structures.

Figure 9:
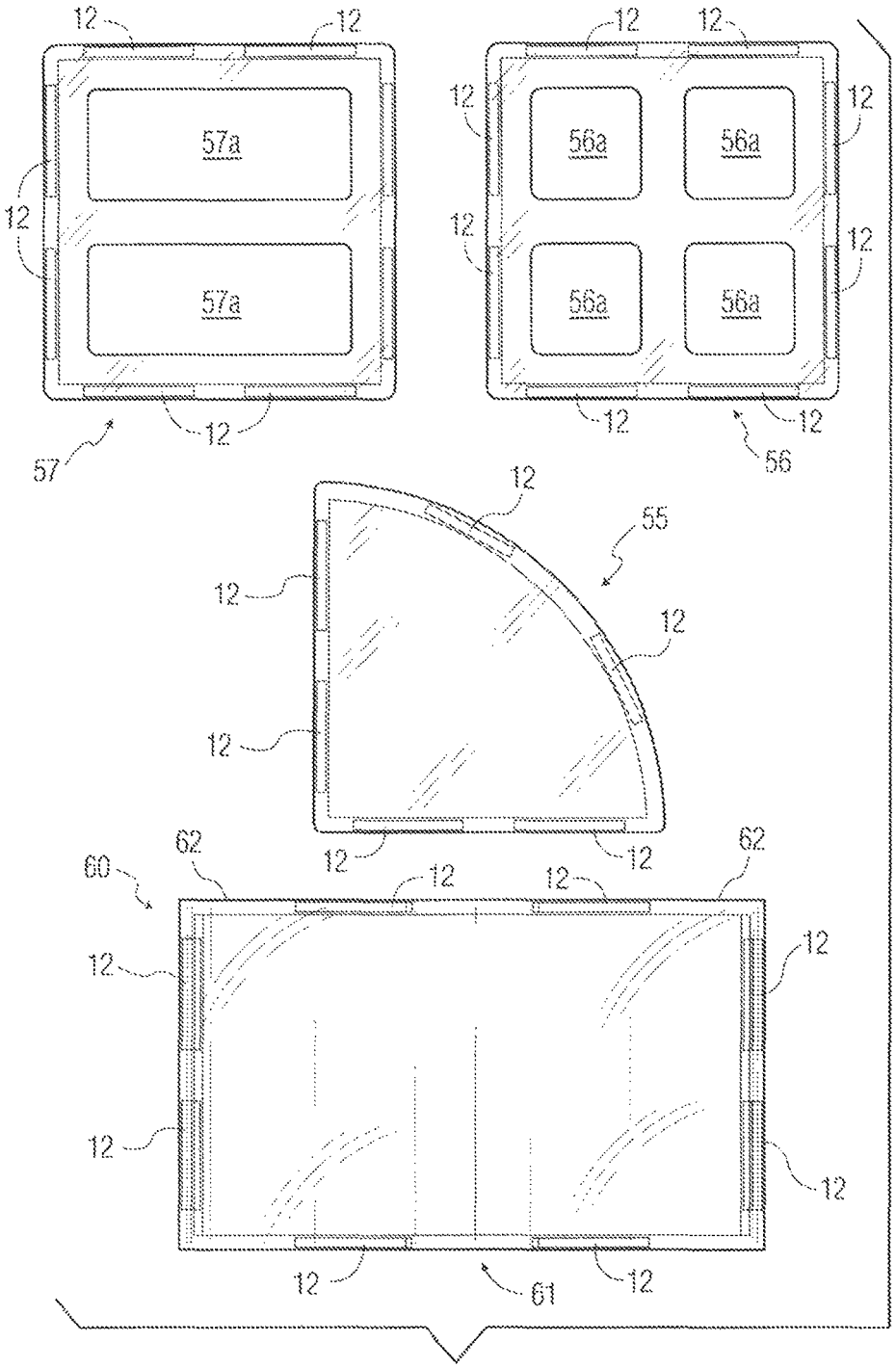
FIG. 9 shows square environmental elements with two and four window sections, a circle quadrant element and a top view of an arch component.

In FIG. 9 Element 55 is a circular quadrant structure with six magnets 12. Elements 56 and 57 are square shaped with element 56 having four window cutouts 56a and element 57 having two rectangular cutouts 57a.

Figure 11:
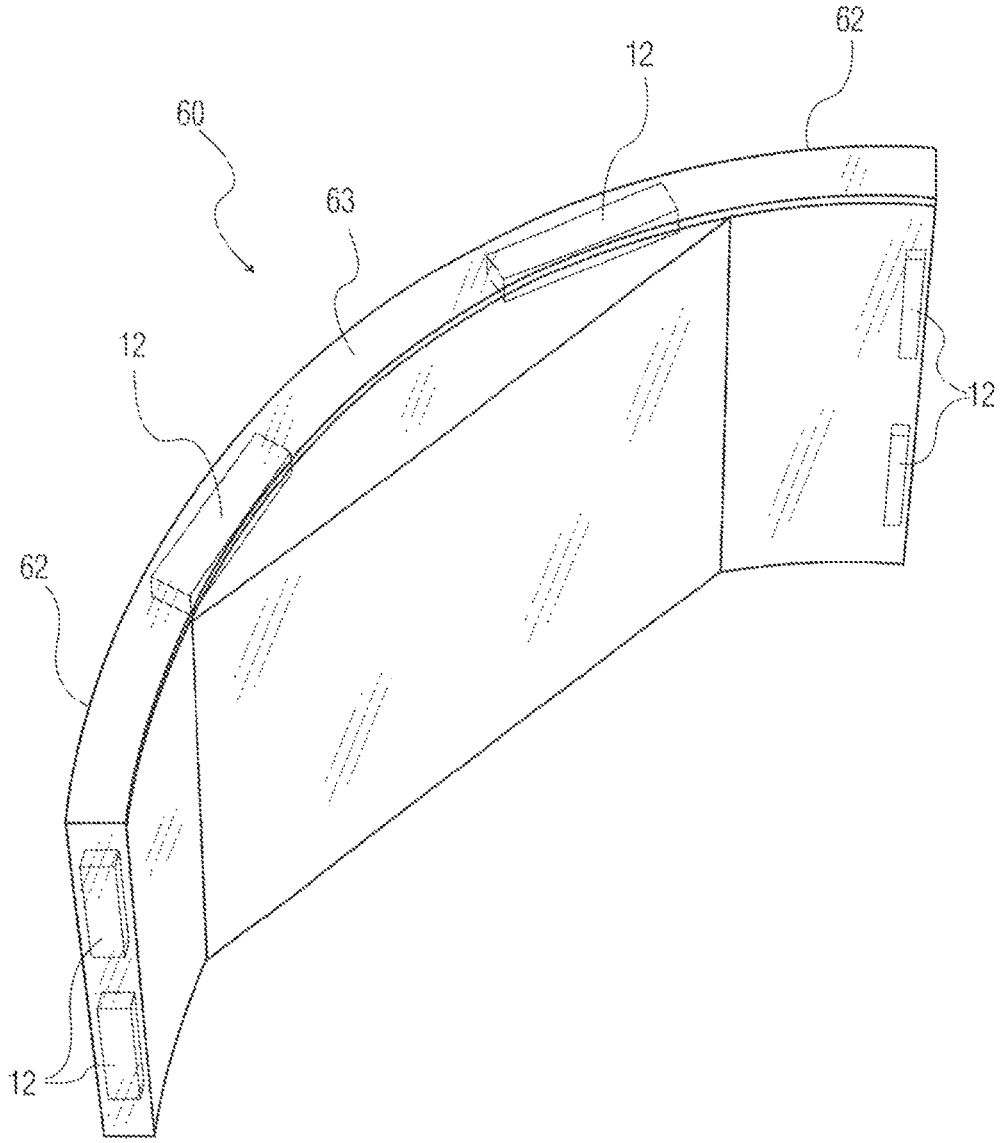
FIGS. 11-14 show the arch element of FIG. 9 as assembled with another arch element and the circle quadrants of FIG. 9 in magnetically assembling a stable self-supporting open and closed arch structure.
Figure 13:
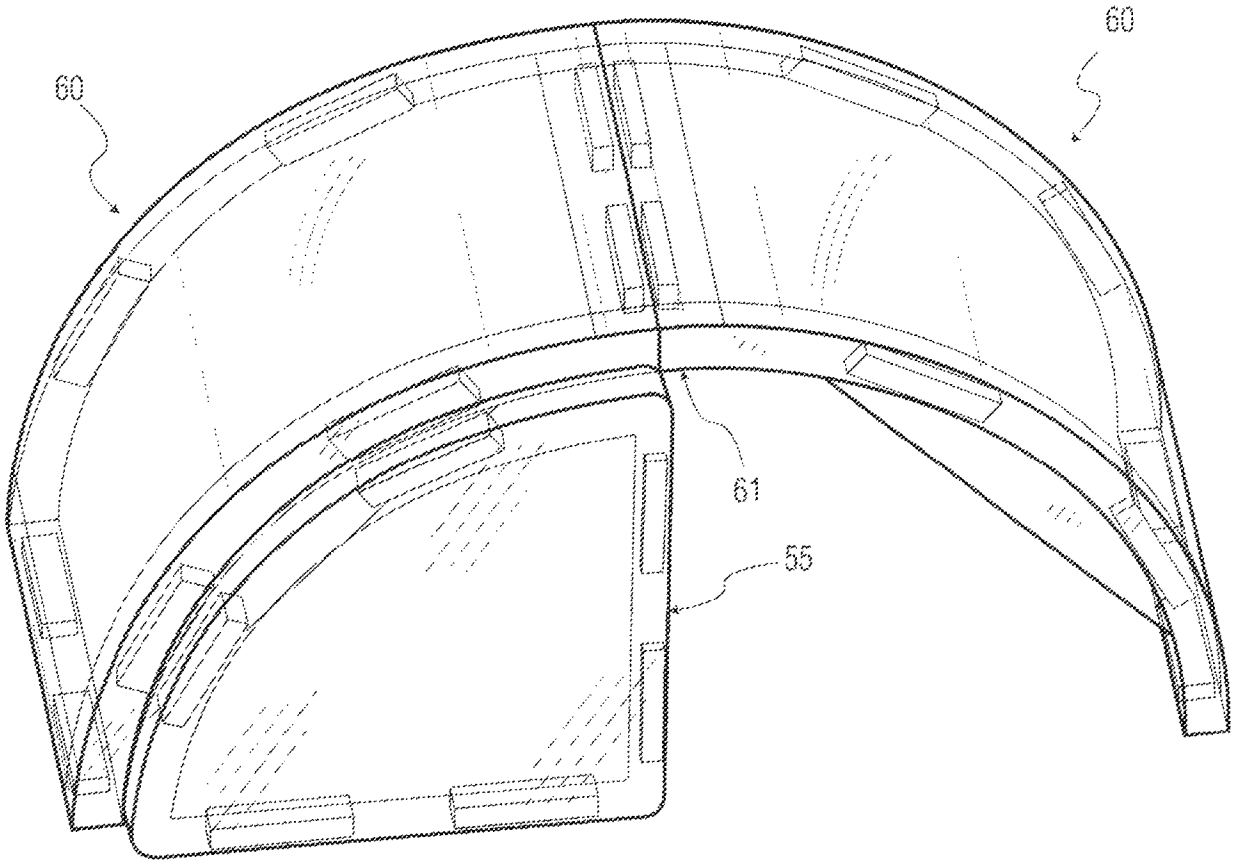
Figure 14:
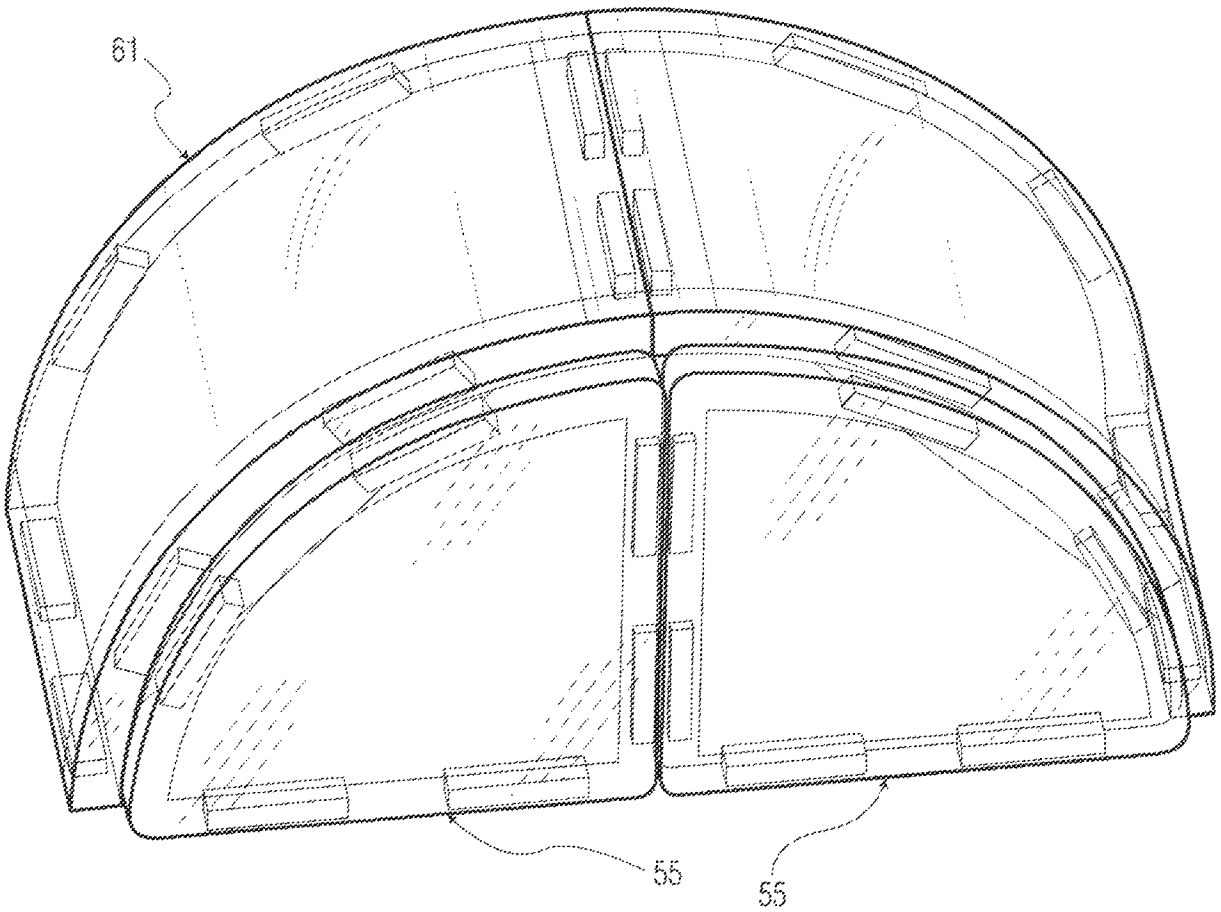

Arch element 60 shown in a top view in FIG. 9 is shown from the bottom in FIG. 11 and in a standing view in FIG. 12 forming an arch 61 with a second magnetically attached element 60. Arch element 60 has two imbedded magnets at each of the ends of its curve 62 and two magnets at each of its sides 63. As seen in FIGS. 13 and 14, circular quadrant elements 55, shown in FIG. 9, are used to stabilize the arch 61 in a structurally rigid configuration of FIG. 14.

Figure 10:
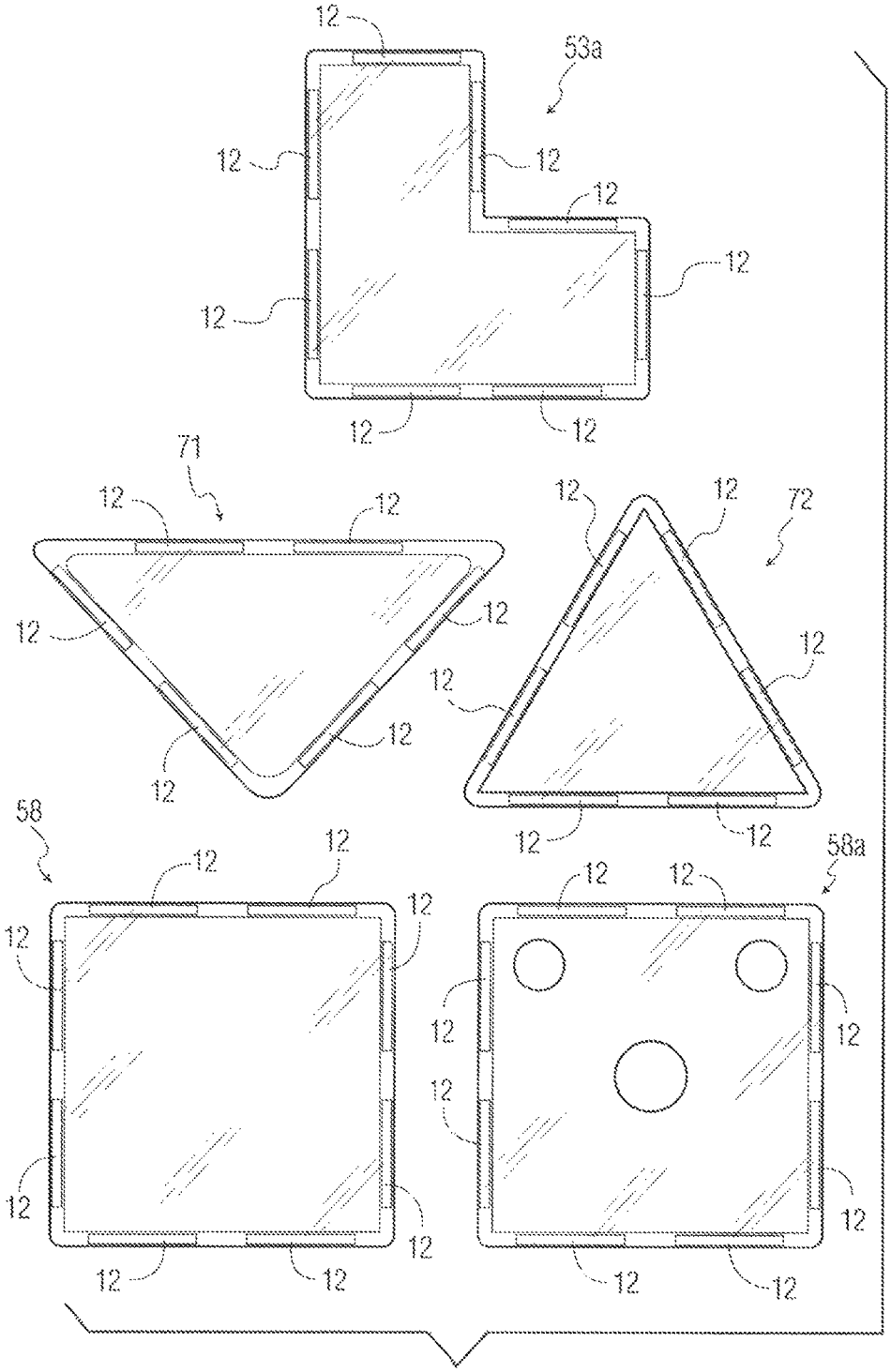
FIG. 10 shows various environmental elements of squares, one with one having circular cutouts; two triangle elements (one isosceles and the other equilateral) and an L-shaped element.

FIG. 10 depicts various other structural elements of square 58 and square 58a with circular cutouts for connective structural building with other elements (not shown). Each of the squares 58 and 58a have eight magnets 12. Triangles 71 and 72 are of isosceles and equilateral configurations with each have six magnets 12 with each triangle side having two imbedded magnets.

It is understood that the above detailed description and drawings are merely exemplary of the invention and that changes in structure, types of elements, magnet placements and the like are possible without departing from the scope of the invention as defined in the following claims.

What is claimed is:

1. A toy [train] track [element] *segment* comprised of a non-magnetic material having at least one end with at least one magnet imbedded in the end adjacent an edge of the end, with the imbedded magnet being positioned for magnetic coupling with a magnet in another toy [train] track [element] *segment* when respective ends of the track [elements] *segments*, having imbedded magnets are abutted to effect a magnetic coupling between multiple toy [train] track [elements] *segments* to provide a toy [train] track structure, wherein each track [element] *segment* comprises a pair of track elements configured to hold and guide wheels of a toy [train] during movement of the toy [train] on the toy [train] track structure and wherein the abutting magnetic coupling of track [elements] *segments* effects alignment of [tracks] *track elements* of the respective toy [train] track [elements] *segments*, and wherein *the abutted edges are each flat along the entirety of their respective length and* the magnets of the abutted edges *have lengths that are greater than their widths*

*and* are [configured to be attracted] *disposed lengthwise along the abutted edges such that the magnets attract* to each other and *do* not [repelled] *repel regardless of inverted abutment of the edges and such that the edges abut in a flush manner* regardless of inverted abutment of the edges.

2. The toy [train] track element of claim 1, wherein each abutted edge has at least two magnets imbedded therein with the magnets being symmetrically positioned relative to a length of an abutted edge.

3. The toy [train] track element of claim 1, wherein the track [element] *segment* is configured with a longitudinally extending curve.

4. The toy [train] track element of claim 1, wherein the track [element] *segment* is configured with a rectangular or square shape.

5. A *first* toy [train] track [element] *segment* comprised of a non-magnetic material having at least one end with at least [one magnet] *two magnets having lengths greater than their widths* imbedded *lengthwise* in the end adjacent an edge of the end, with the imbedded [magnet] *magnets* being positioned [for magnetic coupling with a magnet] *to be attracted to and not repelled by at least two magnets* in *an end of* another toy [train] track [element] *segment* when respective ends of the track [elements, having] *segments are in abutment with one another regardless of inverted abutment of the respective ends, wherein the respective ends of the track segments are flat and abut in a flush manner regardless of inverted abutment, wherein* imbedded magnets are abutted to effect a magnetic coupling between multiple toy [train] track [elements] *segments* to provide a toy [train] track structure, wherein each track [element] *segment* comprises a pair of track elements configured to [hold and] guide wheels of a toy [train] during movement of the toy [train] on the toy [train] track structure and wherein the abutting magnetic coupling of track [elements] *segments* effects alignment of [tracks] *track elements* of the respective toy [train] track [elements] *segments*, wherein the *first* track [element] *segment* comprises a cross-over track section comprising a quadrilateral configuration with two pairs of [tracks crossing] *track elements intersecting* each other at right angles and configured to guide [and hold] the toy [train] travelling in different directions.

6. A *plurality of the* toy [train] track structure [comprised of multiple non-magnetic track segments] of claim 1, *wherein, the plurality of the toy track structures are* sequentially magnetically coupled with each other in a closed [toy train track structure] *loop*.

*7. A toy comprising:*

*a first track segment and a second track segment;*

*the first track segment comprising a non-magnetic material having a bottom side, a top side opposite the bottom side, the top side and bottom side being surrounded by an edge that defines a shape of the first track segment, and at least one end with a first magnet having a length greater than its width imbedded lengthwise in the end adjacent the edge;*

*the second track segment comprising a non-magnetic material having a bottom side, a top side opposite the bottom side, the top side and bottom side being surrounded by an edge that defines a shape of the first track segment, and at least one end with a second magnet having a length greater than its width imbedded lengthwise in the end adjacent the edge;*

*the first magnet and second magnet being positioned such that magnetic coupling of the first magnet and second magnet is achieved when respective ends of the first track segment and second track segment are abutted,*

*wherein the respective ends of the first track segment and second track segment are configured to abut in a flush manner when the track segments are inverted and when the track segments are not inverted;*

*wherein the top side of the first track segment and the top side of the second track segment each include at least one channel such that a channel of the first track segment aligns with a channel of the second track segment when the first and second track segments are magnetically coupled; and*

*wherein the first magnet and the second magnet attract to each other and do not repel regardless of inverted abutment of the edges.*

* * * * *